Feb. 27, 1934.　　　E. S. MacPHERSON　　　1,948,929
LUBRICATING SYSTEM
Filed Jan. 13, 1930　　　2 Sheets-Sheet 1

INVENTOR
Earle S. MacPherson.
BY Whittemore Hulbert
Whittemore Belknap
ATTORNEY

Feb. 27, 1934.  E. S. MacPHERSON  1,948,929
LUBRICATING SYSTEM
Filed Jan. 13, 1930    2 Sheets-Sheet 2
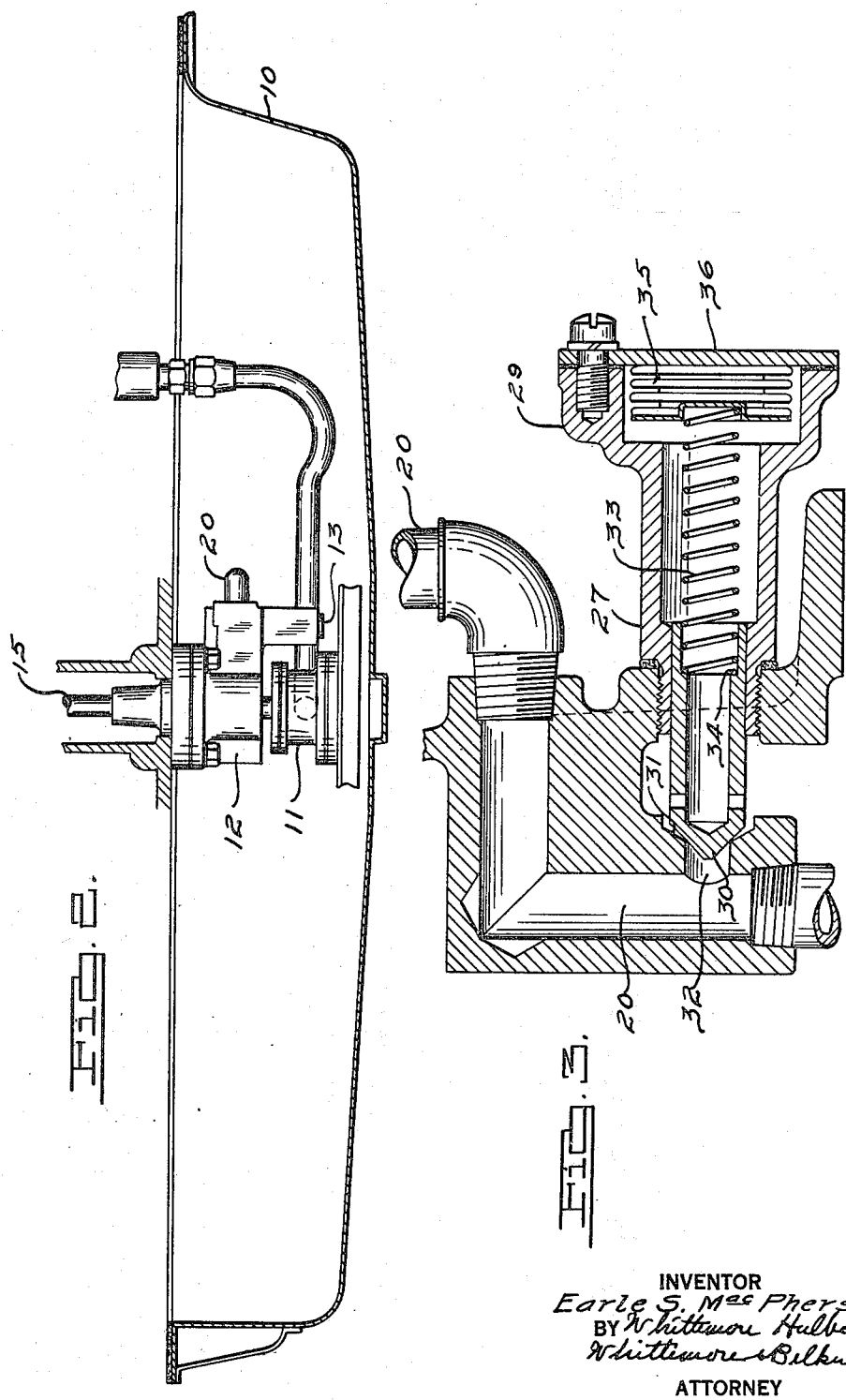
INVENTOR
Earle S. MacPherson.
BY
ATTORNEY Patented Feb. 27, 1934

1,948,929

UNITED STATES PATENT OFFICE 1,948,929

LUBRICATING SYSTEM

Earle S. MacPherson, Detroit, Mich., assignor to Hupp Motor Car Corporation, Detroit, Mich., a corporation of Virginia Application January 13, 1930. Serial No. 420,561

9 Claims. (Cl. 184—6)

This invention relates generally to lubricating systems and more particularly to temperature responsive means for automatically controlling the flow of lubricant.

One of the principal objects of this invention is to provide a lubricating system with thermostatic means for controlling the flow of the lubricant to the point or points of distribution.

Another object of the invention is to provide a cooling system for the lubricant and temperature responsive means for controlling the flow of the lubricant to the cooling system.

A further advantageous feature of this invention resides in the provision of a lubricating system having a pressure relief valve and thermostatic means responsive to temperature variations of the lubricant for controlling the pressure at which the relief valve is adapted to operate.

A still further object of the invention is to provide a lubricating system with a cooling unit having a spring actuated pressure relief valve for controlling the flow of lubricant thereto together with thermostatic means responsive to variations in temperature of the lubricant for varying the tension of the spring to vary the pressure at which said valve is adapted to operate.

With the foregoing as well as other objects in view the invention resides in the novel construction and arrangements of parts which will be made more apparent as this description proceeds, especially when considered in connection with the accompanying drawings wherein:

Figure 2 is a fragmentary longitudinal sectional view through the crank casing of an internal combustion engine. And Figure 3 is an enlarged sectional view of my improved pressure relief valve.

Figure 1:
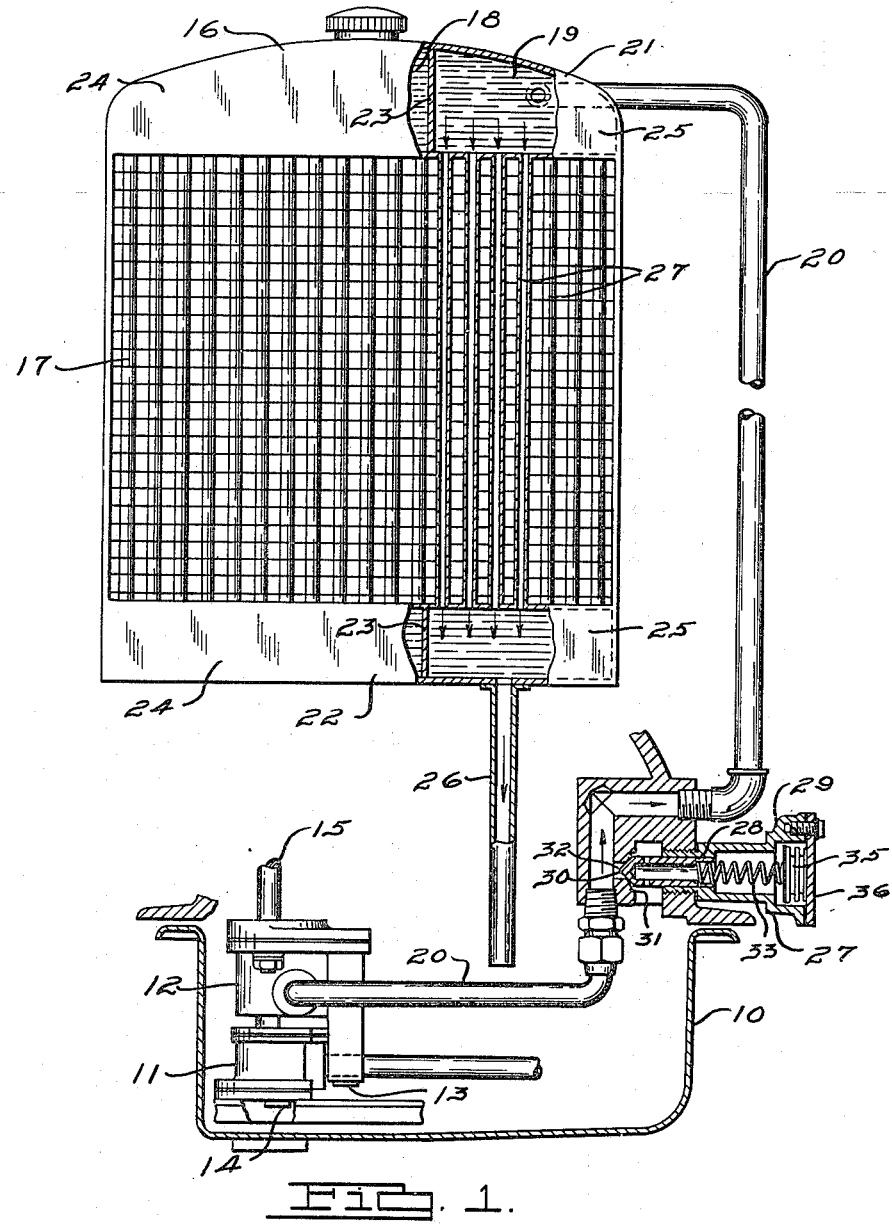
Figure 1 is a diagrammatic sectional view illustrating a lubricating system designed in accordance with this invention.

Referring now to the drawings, it will be noted that there is illustrated in Figure 1 a crank casing 10 of an internal combustion engine adapted to contain a supply of lubricant and also to enclose the main pressure pump 11 of conventional design and an auxiliary pressure pump 12. The auxiliary pump 12 is positioned above the main pump 11 with the intake opening 13 thereof positioned above the intake opening 14 for the main pump so as not to rob the latter of lubricant in the event the latter drops below its normal level. Both the main and auxiliary pumps are driven in the conventional manner by the accessory shaft 15 of the engine and are capable of independently distributing lubricant to various points of distribution. The main pump 11 is adapted to distribute lubricant to the various bearings and points of the chassis in accordance with the usual practice, while the auxiliary pump 12 is designed to distribute lubricant to a cooling unit 16.

The cooling unit 16, illustrated herein, comprises a radiator 17 divided into two sections 18 and 19. The section 18 is arranged in the conventional water circulatory system and is adapted to cool the water for the engine, while the section 19 communicates with the pressure line 20 extending from the auxiliary pump 12 to cool the lubricant in the crank case. As shown in Figure 1, the upper and lower headers 21 and 22, respectively, of the radiator 17 are formed with partitions 23 which serve to divide the headers 21 and 22 into water chambers 24 and lubricant chambers 25. The upper lubricant header 25 is connected to the pressure line 20 from the auxiliary pump 12 to receive the lubricant, while the lower lubricant header 25 communicates with the interior of the crank case by means of a return conduit 26. The arrangement is such that the lubricant upon being discharged into the upper lubricant header flows through the cooling tubes 27 into the lower lubricant header and is then conducted back into the crank case through the conduit 26. Thus it will be observed that the lubricant in the crank case is maintained at the desired temperature and prevented from overheating and loosing its body.

In order to maintain the pressure of the lubricant distributed into the radiator below a predetermined amount and in order to prevent the flow of lubricant into the radiator when the same is below a predetermined temperature, I provide a pressure relief valve 27 in the pressure line 20 which is responsive to temperature variations of the lubricant to either discharge the latter into the cooling unit or to by-pass the same into the crank casing depending upon the temperature of the lubricant. The pressure relief valve comprises a valve member 28 reciprocably mounted within a casing 29 and having a tapered end portion 30 adapted to engage a seat 31 formed in the by-pass 32. The tapered end portion 30 of the valve member is normally maintained into engagement with the seat 31 for closing the by-pass by means of a coil spring 33 having one end engaging a shoulder 34 formed on the valve member and the opposite end abutting the movable end of a suitable thermostat 35. The opposite end of the thermostat being rigidly clamped between the casing 29 and the cap member 36 therefor. The thermostat 35 is so arranged with respect to the crank casing as to receive heat mainly therefrom and as a consequence is responsive to variations in temperature of the lubricant within the casing. From the foregoing it will be observed that the thermostat 35 varies the pressure at which the valve member 28 is adapted to operate by varying the length or tension of the spring 33.

The above construction is such that when the lubricant in the crank case is comparatively cold or, in other words, when the parts of the relief valve including the thermostat 35 are in the position illustrated in Figure 3, the pressure exerted upon the valve member 28 by the spring 33 is substantially less than the pressure of the lubricant flowing through the passage 20. As a consequence, the lubricant will force the end 30 of the valve member 28 away from its seat 31 and flow through the by-pass 32 back into the crank casing. This operation continues until the temperature of the lubricant rises sufficiently to expand the thermostat 35 to shorten the spring 33 and thereby increase the force tending to close the valve member 28 above the pressure of the lubricant flowing through the passage 20 tending to open the valve. When this latter condition exists, the valve 28 maintains the by-pass 32 closed with the result that the lubricant is compelled to flow into the radiator. It should be noted, however, that in the event the pressure of the lubricant flowing through the passage 20 exceeds a predetermined amount, the valve member 28 will function as a conventional relief valve to by-pass the lubricant back into the crank casing.

Thus from the foregoing it will be apparent that I have provided a lubricating system with means not only responsive to pressure variations of the lubricant to control the flow of the same, but also responsive to temperature variations of the same for controlling the flow thereof. While the herein described arrangement finds particular utility for controlling the flow of lubricant to a cooling unit, it should be understood that the same may be used with equal facility for controlling the flow of lubricant to various other points of distribution and accordingly reservation is made to make such changes as may come within the purview of the accompanying claims.

What I claim as my invention is:

1. In a lubricating system, means for receiving lubricant, means for conducting a supply of lubricant to the means aforesaid, a pressure relief valve for controlling the flow of lubricant to said first mentioned means and thermostatic means for controlling the operation of said relief valve.

2. In a lubricating system, means for receiving lubricant, means for conducting a supply of lubricant to the means aforesaid, a spring actuated pressure relief valve for controlling the flow of lubricant to said first mentioned means and thermostatic means for varying the tension of the spring to vary the pressure required for operating said valve.

3. In a lubricating system, means for receiving lubricant, means for conducting a supply of lubricant to the means aforesaid, a spring actuated pressure relief valve for controlling the flow of lubricant to said first mentioned means, and means responsive to temperature variations of the lubricant for varying the tension of the spring and thereby vary the pressure at which said valve is adapted to operate.

4. In a lubricating system, a cooling unit for cooling the lubricant, means for conducting a supply of lubricant to the said unit, means for by-passing the lubricant prior to its flow into the cooling unit, a valve normally closing said by-pass and movable to open position by the pressure of the lubricant, a spring normally holding said valve in closed position, and thermostatic means responsive to temperature variations of the lubricant for actuating the spring to vary the tension thereof and as a consequence vary the pressure required to open the valve.

5. In a lubricating system for an internal combustion engine the combination with a source of lubricant under pressure of a main pump, of a second source of lubricant under pressure of an auxiliary pump, a cooling unit arranged to receive the lubricant discharged by the auxiliary pump, a relief valve for controlling the pressure of the lubricant conducted to the cooling means and thermostatic means responsive to temperature variations of the lubricant for controlling the pressure at which said valve is adapted to operate.

6. In a lubricating system, a lubricant reservoir, a cooling unit communicating with the reservoir, means for conducting a supply of lubricant under pressure to said unit, means for by-passing the lubricant prior to its flow into the cooling unit, a valve normally closing said by-pass and movable to open position by an excess pressure of the lubricant, and temperature responsive means for varying the pressure at which said valve is adapted to operate to open said by-pass.

7. In a lubricating system, the combination with an internal combustion engine having a crank casing adapted to contain a supply of lubricant, a cooling unit for the lubricant, a lubricant pump having the intake side communicating with the crank case and the exhaust side thereof communicating with the cooling unit, a by-pass establishing communication between the exhaust side of the pump and the crank case at a point between said pump and cooling unit, a pressure operated relief valve controlling communication through the by-pass, and means responsive to the temperature of the lubricant in the crank casing for regulating the pressure at which said valve is adapted to operate.

8. In a lubricating system, the combination with a water cooled internal combustion engine having a crank case adapted to contain a supply of lubricant, a radiator of the tube type having a plurality of tubes communicating with the water chambers in the engine and having a series of tubes for receiving lubricant from the crank case of the engine, of a pump having the intake side communicating with the interior of the crank case and having the exhaust side communicating with the series of tubes aforesaid in the radiator, a by-pass establishing communication between the exhaust side of the pump and crank case at a point between the pump and series of tubes, a pressure relief valve controlling communication through the by-pass, and temperature responsive means for regulating the operation of the valve to vary the pressure at which the same is adapted to operate.

9. In a lubricating system, the combination with a water cooling system including, a radiator of the type having a plurality of tubes for receiving the water and having another series of tubes communicating with a source of lubricant supply, of means for conducting lubricant from the source of supply to the second named series of tubes aforesaid, means for by-passing the lubricant prior to its flow into the latter tubes, a pressure relief valve for controlling said by-pass, and temperature responsive means for controlling the operation of said valve.

EARLE S. MACPHERSON.